United States Patent [19]

Morrisroe, Jr.

[11] Patent Number: 4,641,843
[45] Date of Patent: Feb. 10, 1987

[54] SYSTEM AND METHOD FOR LEVELING A CONVERTED MOTOR HOME

[76] Inventor: John J. Morrisroe, Jr., 20 Dowling Dr., Ridgefield, Conn. 06877

[21] Appl. No.: 714,279

[22] Filed: Mar. 21, 1985

[51] Int. Cl.⁴ .......................................... B60G 11/26
[52] U.S. Cl. ................................... 280/6 R; 280/714
[58] Field of Search ............... 280/6 R, 6 H, DIG. 1, 280/714

[56] References Cited

U.S. PATENT DOCUMENTS

| | | | |
|---|---|---|---|
| 2,443,433 | 6/1948 | Sanmori | 280/711 |
| 2,670,201 | 2/1954 | Rossman | 267/65 |
| 2,862,726 | 12/1958 | Bertsch | 280/702 |
| 2,881,799 | 4/1959 | Menewisch | 280/712 |
| 2,929,640 | 3/1960 | Faiver | 280/124 |
| 3,002,764 | 10/1961 | Clark, Sr. | 280/104 |
| 3,112,118 | 11/1963 | Weller | 280/6 |
| 3,197,231 | 7/1965 | Holzman | 280/6 |
| 3,592,485 | 7/1971 | Buhl | 280/124 |
| 3,752,497 | 8/1973 | Enke et al. | 280/112 |
| 3,770,292 | 11/1973 | Palazzetti | 280/6 |
| 3,831,969 | 8/1974 | Lindblom | 280/124 |
| 3,836,161 | 9/1974 | Buhl | 280/6 |
| 3,881,736 | 5/1975 | Wilfert | 280/6.1 |
| 3,912,289 | 10/1975 | Czajkowski, Jr. | 280/6.1 |
| 3,917,307 | 11/1975 | Shoebridge | 280/104 |
| 3,933,359 | 1/1976 | Wallace | 280/6 |
| 4,084,830 | 4/1978 | Daniel, Jr. et al. | 280/6.1 |
| 4,335,901 | 6/1982 | Gladish | 280/6 R |
| 4,396,202 | 8/1983 | Kami et al. | 280/6 |

Primary Examiner—John J. Love
Assistant Examiner—Ross Weaver
Attorney, Agent, or Firm—Parmelee, Bollinger & Bramblett

[57] ABSTRACT

A method and system are provided for installation in a vehicle having an air suspension system comprising four air beams, each supported over a vehicle axle by bellows supplied by air from an air tank, and under control of one front and two rear height control valves. Manually selective leveling control apparatus is installed in this system for leveling the vehicle, particularly when the vehicle (which has been converted from a bus to a motor home) is parked. Four five-way ball leveling valves are installed in the air suspension system. Each leveling valve is installed between a different height control valve, the bellows of an air beam, and the common air tank. Each five-way valve provides a means for adjusting the pressurized air to its associated air beam by manually setting it to: (1) a "raise" position which admits pressurized air directly from the air tank to the air beam; (2) a "lower" position in which the air beam is vented through the exhaust port of the valve; (3) a "hold" position in which the air beam is connected to a plugged valve opening; or (4) to an "automatic" position in which the air beam is placed under the control of the automatic height control valve by connecting the air beam directly to the automatic height control valve. The leveling valves are all mounted on, and controlled from, a control panel positioned near the driver's seat.

5 Claims, 2 Drawing Figures

SYSTEM AND METHOD FOR LEVELING A CONVERTED MOTOR HOME

BACKGROUND OF THE INVENTION

This invention relates to a manually controllable leveling apparatus for installation in the air suspension system of a vehicle.

Converting motor coaches to motor homes and campers has become very popular in view of the size and space which is provided by such a conversion as well as to its being cheaper than buying a new, fully equipped mobile home. One popular conversion vehicle is the General Motors Model 4104 coach which has a suspension system in which air beams resiliently support the body of the vehicle over its axles. The air beam is a hollow closed beam supported by bellows which communicate with the interior of the beam and contain a volume of air under sufficient pressure to support the body of the vehicle above the axle. This air suspension system basically comprises four air beams, eight air bellows, three height control valves, and radius rods and shock absorbers at each axle. Suspension supports provide a means for connecting the suspension system to the axles and the operation of this system is completely automatic for maintaining a constant vehicle height regardless of the load. Such an air suspension system is described in detail in *GM Coach Maintenance Manual*, X-5818, Section 14, pages 215-238. Such suspension systems are usually adequate for motor coaches and while on the road. However, when such coaches have been converted and are being used as motor homes, they are often parked on uneven or sloping terrain. No means is provided to selectively raise or lower portions of the vehicle in order to level the vehicle body. Parking on sloping or uneven terrain may hamper or prevent the operation of certain appliances and the sanitation systems of the vehicle and would, at the least, make for uncomfortable living quarters.

SUMMARY OF THE INVENTION

Accordingly, it is an object of this invention to provide vehicle leveling apparatus which may be installed with, or used to modify, the air suspension system of a vehicle serving as a motor home, camper, etc., to provide a level body regardless of the terrain on which it is parked.

A further object of this invention is to provide a new and improved vehicle leveling apparatus with selective manual control.

Still a further object of this invention is to provide a new and improved vehicle leveling and stabilizing system which may be readily installed and used to operate the air suspension system of a vehicle which will allow automatic vehicle leveling as well as non-automatic raising or lowering of portions of the vehicle.

Still a further object of this invention is to provide a new and improved vehicle leveling and stabilizing system which is simple to install and operate and provides a central, single operating location.

In carrying out this invention in an illustrative embodiment thereof, a vehicle leveling and stabilizing system comprising four air beams, each supported over a vehicle axle by bellows supplied with air from a common air tank under the control of a height control valve, is modified by installing four five-way ball leveling valves. Each of the leveling valves is installed between one of the height control valves and the bellows of one of the air beams and is connected to the air tank. Each air beam is individually adjusted by manually setting its leveling valve to "raise", "lower" or "hold", for leveling the vehicle while parked or to an "automatic" setting which permits the height control valves to automatically control the leveling function of the vehicle when on the road.

Advantageously, the four five-way leveling valves are installed and operated from a single panel which may be located near the driver's seat of the vehicle. The installation is simple and requires no substantial alteration of the vehicle's standard air suspension system. The operation is easily accomplished by adjusting four leveling valves and a pressure regulator from a control panel providing great flexibility in leveling and stabilizing the vehicle whether moving or parked, on level or uneven, ground.

BRIEF DESCRIPTION OF THE DRAWINGS

The invention, together with further objects, advantages, features, and aspects thereof will be more clearly understood from the following description considered in conjunction with the accompanying drawings.

DESCRIPTION OF THE PREFERRED EMBODIMENT

Figure 1:
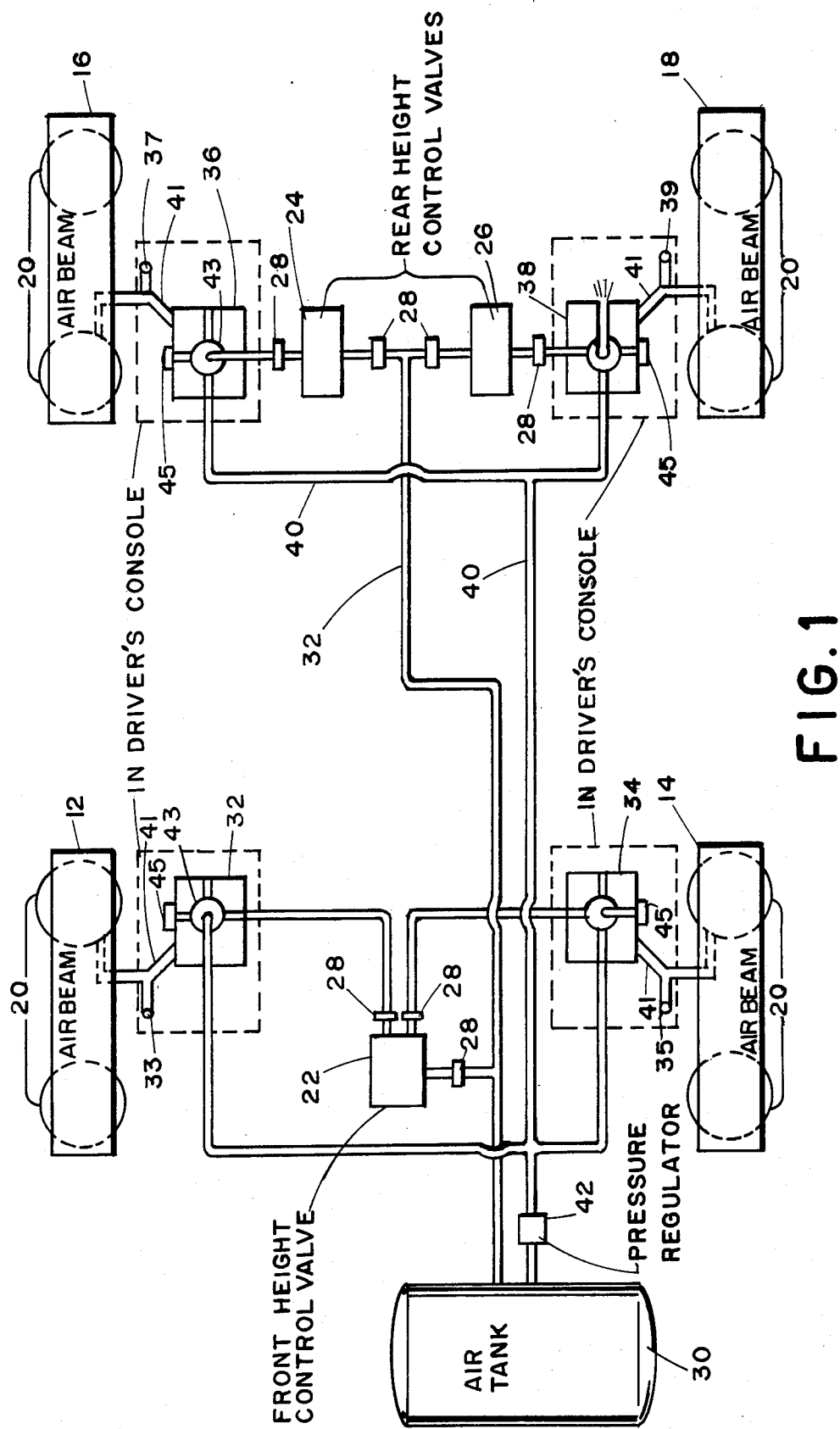
FIG. 1 is a schematic diagram of an air suspension system in accordance with the present invention.

Referring now to FIG. 1, a conventional air suspension system as installed in the aforesaid General Motors Coach Model 4101 includes four air beams 12, 14, 16, and 18, eight bellows 20, a front height control valve 22, and two rear height control valves 24 and 26. Radius rods and shock absorbers at each axle are not illustrated inasmuch as they are conventional and form no part of the present invention. Detailed information with respect to this as well as other information concerning the illustrated air suspension system may be had by reference to the aforesaid Maintenance Manual.

Air filters 28 are used at the input and outputs of height control valves 22, 24 and 26 to prevent foreign matter from entering the control valves. Compressed air for the system is supplied from an air tank 30 through line 32 to the height control valves 22, 24, and 26. The height control valves are actuated by relative movement between the body of the vehicle and the axles. For example, when more load is added to the coach, the height control valves automatically meter more compressed air to the air beams 12, 14, 16, and 18 and their associated bellows 20 to compensate for the added weight which keeps the coach body at its original height. If the load on the vehicle decreases, the height control valves release air to the atmosphere to decrease the pressure in the air beams and thereby maintain the body of the vehicle at the same height.

Figure 2:
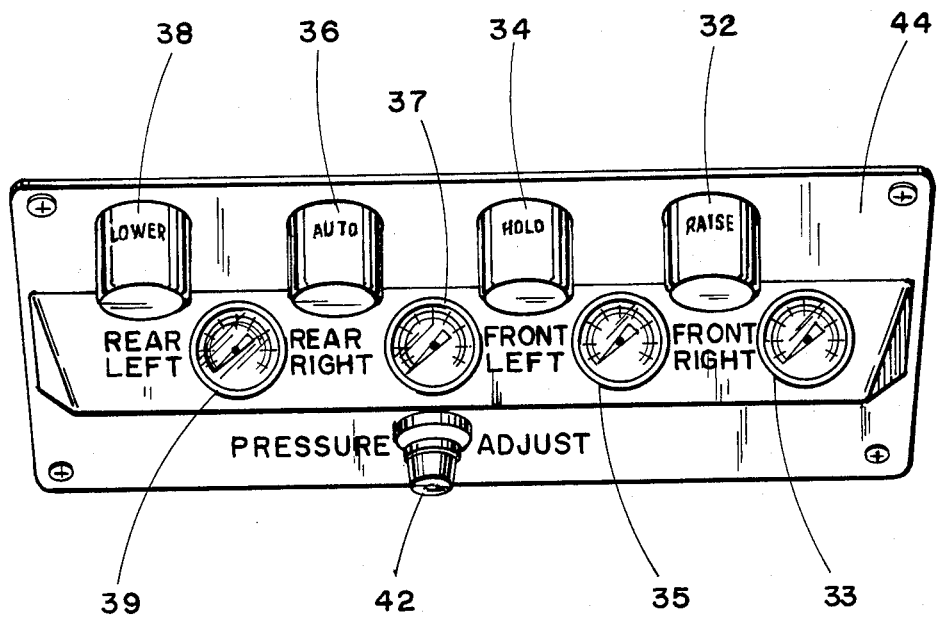
FIG. 2 illustrates a panel for manual control of the air suspension system illustrated in FIG. 1.

In accordance with the present invention, manually operable five-way ball leveling valves 32, 34, 36, and 38 are coupled between the air tank 30 and air beams 12, 14, 16, and 18, by an air line 40. Each leveling valve 32, 34, 36, and 38 has an associated air gauge 33, 35, 37, or 39, respectively. A pressure regulator 42 is provided in the line 40. The manually operable leveling valves 32, 34, 36, and 38 and their associated pressure gauges 33, 35, 37, 39, as well as pressure regulator 42, are all mounted on a panel or console 44 as shown in FIG. 2 which is located near the driver's seat.

Each five-way ball leveling valve has an angle-ported ball and is used as a selector valve. Pressure or fluid in the bottom port of the valve can be directed to any of four different outlets. One suitable type of valve is a Whitey Series 43Z five-way valve manufactured by Whitey Co., Highland Heights, Ohio.

Since the leveling valves and their associated gauges are located in the driver's console 44, all that is necessary for installation is the running of air lines from the leveling valves at the console to the associated height control valves and air beams which are to be controlled thereby, as illustrated in FIG. 1. Accordingly, no extensive modification of the basic or conventional air suspension system associated with the vehicle is required, making the modification of an existing system relatively simple and inexpensive. Obviously, the leveling system could also be supplied in an original installation in the manner shown in FIG. 1.

For purposes of explanation, the four leveling valves 32, 34, 36, and 38 of FIG. 1 are illustated in the four different positions of "lower", "raise", "hold", "automatic". Each valve has a bottom port which is connected by a line 41 to its associated air beam. Rotation of the ball 43 connects the bottom port to one of the other four outlets. One outlet 45 is capped.

The leveling valve 32 is shown in the "raise" position. In this position, the ball 43 is rotated so that compressed air from line 40 is passed through the bottom port and line 41 into the bellows 20 of the air beam 12, thereby raising the right front corner of the coach relative to its axle. Pressure is monitored by pressure gauge 33. The level control valve 38 is in the "lower" position. The ball is positioned such that air from the left rear air beam is vented through line 41 to an open outlet port of valve 38. This releases the pressure within the beam and permits the left rear corner of the coach to settle toward the axle. The leveling valve 34 is shown in the "hold" position. The operator being satisfied with the vertical position of the left front corner of the vehicle turns the ball to the illustrated position wherein the line 41 is connected to the plugged opening 45, thereby holding pressure within the air beam 14. Finally, the leveling valve 36 is illustrated in the "automatic" position. When the coach is on the road, the ball 43 is turned to the illustrated position connecting the line 41 from the air beam 16 directly into the right rear height control valve 24. In effect, this removes the leveling valve 36 from the system so that air beam 16 is under the control of the right rear height control valve 24. It will, of course, be apparent that when on the road all leveling valves will be in the "automatic" position. After parking the vehicle, each of the valves will be rotated in turn to either raise or lower one corner of the chassis to achieve a level position as indicated, for example, by a bubble indicator. When leveling is achieved to the operator's satisfaction, each of the valves would be rotated to the "hold" position. When ready to leave the parking space, all valves would be returned to the "automatic" position.

This system has many advantages which include being able quickly to level the coach body when parking or when stopped in traffic from the driver's seat. The coach may be elevated for greater ground clearance when moving over rough terrain. In addition, the body of the vehicle may be lowered for easier entering and exiting when parked or to clear a low underpass. Also, the air pressure in the system may be reduced while traveling on a smooth interstate highway in order to provide a smoother, softer ride. If a flat tire occurs, the entire body may be raised, making it much easier to use a jack stand to jack up the axle and change the tires. Any leaning problems which are caused by a leaking height control valve may be eliminated. The control is centralized and simple with the five-way ball valves being easy to rotate in 90° increments to select the desired port of the five-way ball valve. The valve has a spring-loaded detent permitting the operator to feel and hear when the selector handle is properly positioned.

The modification of the conventional air suspension system by incorporating therein four five-way ball leveling valves as illustrated provides a very simple solution to the complex problem of vehicle leveling. Furthermore, it is flexible to accommodate a variety of leveling and stabilizing functions.

Other changes and modifications varied to fit particular operating requirements and environments will be apparent to those skilled in the art. Accordingly, the invention is not limited to the examples chosen for purposes of illustration but includes all changes and modifications which do not constitute a departure from the true spirit and scope of the following claims.

What is claimed is:

1. In a vehicle having an air suspension system comprising four air beams supporting the corners of the vehicle body over the vehicle axles by bellows supplied by air from an air tank under the control of three height control valves, one height control valve controlling both air beams at one end of the vehicle, the improvement of leveling apparatus which comprises:
   a manually operable five-way leveling valve coupled between said air tank and each of said air beams; and
   means for connecting each of said five-way leveling valves between one of said height control valves and one of said air beams whereby each of said four air beams is under the unique control of its associated five-way leveling valve.

2. The improvement of claim 1 wherein a pressure regulator is connected between said air tank and said leveling valves.

3. The improvement of claim 1 wherein said leveling valves are mounted on a control panel for the manual control of said air suspension system by the operator at a single location in said vehicle.

4. The improvement of claim 1 wherein each of said leveling valves is adjustable to:
   A. a raise position interrupting air flow between its air beam and height control valve while establishing an air flow path between its air beam and said air tank;
   B. a lower position interrupting air flow between its air beam and both of its height control valve and said air tank while establishing an air flow path between its air beam and atmosphere;
   C. a hold position blocking air flow into and out of its air beam; and
   D. an automatic position establishing an air flow path between its air beam and the air tank through one of said height control valves.

5. The method of modifying the normal air suspension system of a vehicle of the type having four air beams supported over the axles of the vehicle by bellows supplied from an air tank with pressurized air under the control of three height control valves, one of said height control valves supplying both air beams at one end of the vehicle, to provide an improved system allowing individual control of the height of each of the four corners of the vehicle, the steps comprising:

installing four five-way leveling valves in the air suspension system, each being connected between a different one of said four air beams and its height control valve;

connecting each of said five-way leveling valves to said air tank; and adjusting each of said leveling valves to uniquely control the clearance between each corner of the vehicle and the ground when the vehicle is parked, or to permit the height control valves to function automatically when the vehicle is moving.

* * * * *